(12) United States Patent
Deboer et al.

(10) Patent No.: US 10,807,809 B1
(45) Date of Patent: Oct. 20, 2020

(54) END PLATE FOR CONVEYOR BELT

(71) Applicant: Honda Motor Co., Ltd., Tokyo (JP)

(72) Inventors: Benjamin Douglas Deboer, Ancaster (CA); Dwayne Switzer, Angus (CA); Benjamin MacArthur, Barrie (CA)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/735,770

(22) Filed: Jan. 7, 2020

(51) Int. Cl.
*B65G 47/66* (2006.01)
*B65G 47/88* (2006.01)

(52) U.S. Cl.
CPC .................. *B65G 47/883* (2013.01)

(58) Field of Classification Search
CPC .............................. B65G 47/66; B65G 47/883
USPC .................................................. 198/324, 539
See application file for complete search history.

(56) References Cited

U.S. PATENT DOCUMENTS

| | | | | |
|---|---|---|---|---|
| 2,862,599 A | * | 12/1958 | Sinden ..................... | B66B 29/06 198/323 |
| 3,137,382 A | * | 6/1964 | Conover .................. | B66B 29/06 198/325 |
| 3,548,996 A | * | 12/1970 | Ellis ........................ | B65G 47/66 198/610 |
| 5,291,982 A | * | 3/1994 | Saito ........................ | B66B 23/12 198/324 |
| 5,597,063 A | * | 1/1997 | Bogle ...................... | B65G 47/66 198/635 |
| 5,971,129 A | * | 10/1999 | Stawniak ................. | B66B 29/08 198/324 |
| 6,138,819 A | * | 10/2000 | Bogle ..................... | B65G 47/66 198/325 |
| 6,550,604 B2 | * | 4/2003 | MacLachlan .......... | B65G 27/16 198/614 |
| 8,567,591 B2 | * | 10/2013 | Gonzalez Alemany ..................... | B66B 23/00 198/600 |
| 9,452,896 B2 | * | 9/2016 | Lee ......................... | B65G 47/66 |

(Continued)

FOREIGN PATENT DOCUMENTS

| | | |
|---|---|---|
| CN | 204021702 U | 12/2014 |
| CN | 104444180 A | 3/2015 |

(Continued)

OTHER PUBLICATIONS

Espacenet Machine Translation of CN Patent No. 104444180 A.

(Continued)

*Primary Examiner* — Douglas A Hess
(74) *Attorney, Agent, or Firm* — Plumsea Law Group, LLC (57) ABSTRACT

An end plate for a conveyor system is described. In one embodiment, a conveyor system includes an endless conveyor belt turned about rollers between an entrance end and an exit end, and an end plate disposed at one end of the belt facing towards a direction of motion of the belt. The end plate includes a plate body including a plurality of projecting members extending from one end of the plate body. The end plate also includes a plurality of finger elements disposed over the plurality of projecting members. Each finger element of the plurality of finger elements includes a slot on a back side of the finger element that is configured to receive a projecting member of the plurality of projecting members. The plurality of projecting members and the plurality of finger elements are configured to face towards the belt.

20 Claims, 7 Drawing Sheets

(56) References Cited

U.S. PATENT DOCUMENTS

| | | | |
|---|---|---|---|
| D819,921 S * | 6/2018 | Pettinga | D34/29 |
| 10,427,891 B2 * | 10/2019 | McKee | B65G 47/66 |
| 10,556,755 B2 * | 2/2020 | Pettinga | B65G 47/66 |

FOREIGN PATENT DOCUMENTS

| | | |
|---|---|---|
| CN | 106586797 B | 4/2017 |
| JP | 2000327254 A | 11/2000 |
| JP | 4340261 B2 | 10/2009 |
| WO | 2016194183 A1 | 12/2016 |
| WO | 2018057688 A1 | 3/2018 |

OTHER PUBLICATIONS

Espacenet Machine Translation of CN Patent No. 106586797 A.
Espacenet Machine Translation of CN Patent No. 204021702 U.
Espacenet Machine Translation of JP Patent No. 4340261 B2.
Espacenet Machine Translation of JP Published Application No. 2000327254 A.
Espacenet Machine Translation of WO Published Application No. 2016194183 A1.

* cited by examiner

END PLATE FOR CONVEYOR BELT

BACKGROUND

The present disclosure relates to the field of conveyor systems, and, more particularly, to a conveyor end plate for a conveyor system.

Assembly lines and other manufacturing facilities often include various types of conveyor systems that are used to move objects or people through different workstations or assembly positions as part of the assembly process. These conveyor systems are typically located in the floor of the facility and include end plates at the junction between the floor and the conveyor to prevent people and objects from being caught by the conveyor.

There is a need in the art for an improved conveyor end plate for conveyor systems.

SUMMARY

In one aspect, an end plate for a conveyor system is provided. The end plate includes a plate body including a plurality of projecting members extending from one end of the plate body. The end plate also includes a plurality of finger elements disposed over the plurality of projecting members. Each finger element of the plurality of finger elements includes a slot on a back side of the finger element that is configured to receive a projecting member of the plurality of projecting members. The plurality of finger elements are separated by a gap between each finger element.

In another aspect, an end plate for a conveyor system is provided. The end plate includes a plate body including at least one projecting member extending from an end of the plate body that is configured to face towards a belt of the conveyor system. The end plate also includes at least one removable finger element disposed over the at least one projecting member. The at least one removable finger element has an approximately pentagonal shape.

In another aspect, a conveyor system is provided. The conveyor system including an endless conveyor belt driven by rollers having a conveying surface and a return surface with the conveying surface defining an entrance end and an exit end defined by the direction of travel of the belt. The system has an end plate disposed at one end of the belt facing towards a direction of motion of the belt. The end plate includes a plate body including a plurality of projecting members extending from one end of the plate body. The end plate also includes a plurality of finger elements disposed over the plurality of projecting members. Each finger element of the plurality of finger elements includes a slot on a back side of the finger element that is configured to receive a projecting member of the plurality of projecting members. The plurality of projecting members and the plurality of finger elements are configured to face towards the belt.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

A conveyor end plate for a conveyor system is described herein. The end plate is adapted to be used with a conveyor system having an endless conveyor belt driven by rollers to provide a conveying surface and a return surface. The conveying surface has an entrance end and an exit end defined by the direction of travel of the belt. The end plate is disposed at one end of the belt facing towards a direction of motion of the belt, and may preferably be disposed at the exit end. According to the techniques of the example embodiments, the described conveyor end plate may be used to prevent objects and/or people from being caught by the conveyor system while also being easy and cost-effective to maintain.

Figure 1:
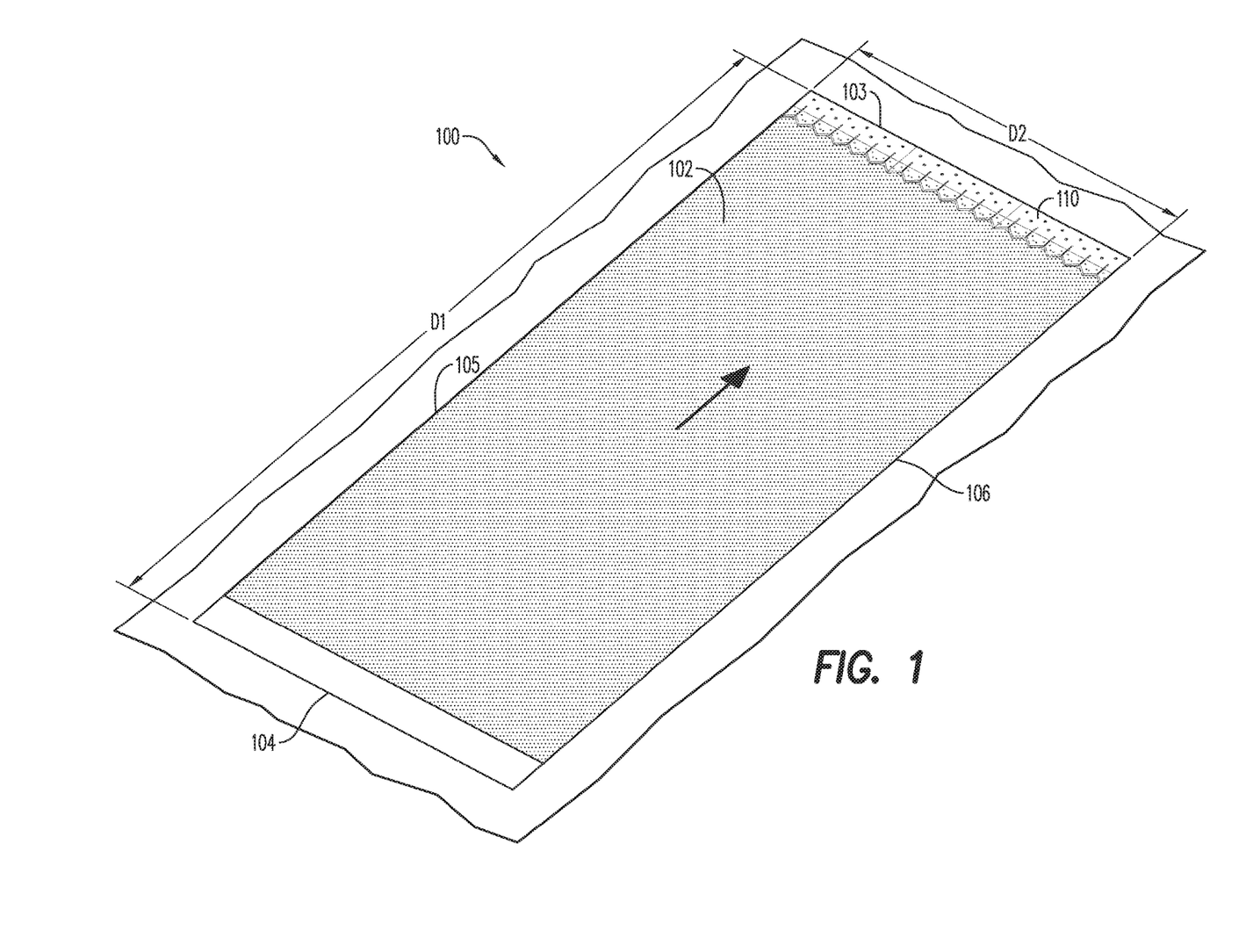
FIG. 1 is a schematic view of an example embodiment of a conveyor system including an end plate.

Referring now to FIG. 1, a schematic view of an example embodiment of a conveyor system 100 including an end plate 110 is shown. In an example embodiment, conveyor system 100 may be located in a floor of an assembly line or manufacturing facility. In this embodiment, conveyor system 100 includes at least an endless belt 102 or other carrying surface on which objects or people are conveyed. In other embodiments, conveyor system 100 may include a chain or other type of surface. Conveyor system 100 also includes additional components conventionally associated with a conveyor system for moving belt 102, including, for example, rollers and motors configured to propel belt 102.

In this embodiment, belt 102 of conveyor system 100 is approximately rectangular shaped, including a first end 103 and a second end 104 along a longitudinal direction defining a length of belt 102 extending a first distance (D1) between first end 103 and second end 104 and a first side 105 and a second side 106 along a lateral direction defining a width of belt 102 extending a second distance (D2) between first side 105 and second side 106. In this embodiment, the rectangular shape of belt 102 is defined by the length (e.g., first distance D1) that is greater than the width (e.g., second distance D2). It should be understood that the configuration and relative dimensions of belt 102 are merely exemplary and conveyor system 100 may include one or more belts having different dimensions. The conveyor belt may be of a typical construction in which the belt moves in an endless loop configuration around rotors. As used herein the term "end" as in either the first end 103 or the second end 104 may refer to the terminus of the surface comprising a conveying length of belt at which point the belt turns on a return rotor to generally proceed underneath the conveying surface of the belt. That is, either an entrance end or an exit end of the conveying surface as defined by the direction of travel. Therefore the end of a belt refers generally to a point at which the conveying surface reaches a termination as the belt returns in its endless loop configuration.

As shown in FIG. 1, end plate 110 is located at one end of conveyor system 100. In this embodiment, end plate 110 is located at first end 103 of belt 102 in the direction of motion of belt 102. That is, one or more motors of conveyor system 100 are configured to propel belt 102 in a direction such that objects or people on belt 102 move in a substantially longitudinal direction along conveyor system 100 from second end 104 towards first end 103. With this configuration, end plate 110 is disposed at the end of conveyor system 100 that coincides with the direction of movement of belt 102.

It should be understood that while end plate 110 is shown in the context of conveyor system 100 disposed in a floor of an assembly line or manufacturing facility, the example embodiments of an end plate described herein may be used in other environments, including, but not limited to other types of conveyor belts or conveyor systems, people movers, elevated conveyors, moving walkways, escalators, etc.

Figure 2:
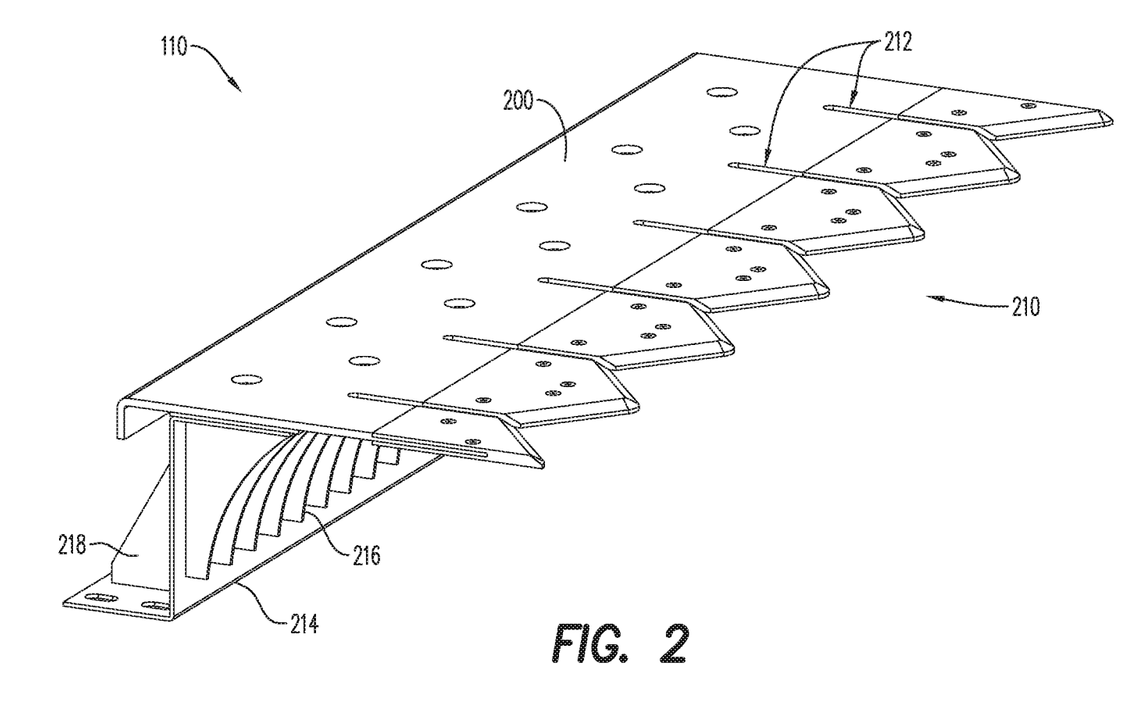
FIG. 2 is an isometric view of an example embodiment of a conveyor end plate.

Referring now to FIG. 2, an isometric view of an example embodiment of conveyor end plate 110 is shown. In an example embodiment, end plate 110 includes a plate body 200 disposed on a top portion of end plate 110. Plate body 200 has an approximately even and flat surface that is configured to be substantially aligned with a top surface of belt 102 of conveyor system 100. With this arrangement, a relatively smooth transition may be achieved when a conveyed object moves from the top surface of belt 102 to the surface of plate body 200 of end plate 110.

In an example embodiment, end plate 110 also includes a plurality of finger elements 210. As shown in FIG. 2, plurality of finger elements 210 are disposed on an end of end plate 110 that faces towards belt 102 of conveyor system 100. In some embodiments, plurality of finger elements 210 are configured to at least partially rest on the top surface of belt 102 of conveyor system 100 so as to eliminate or reduce any gaps or space between the end of belt 102 and the outermost portion of plurality of finger elements 210. For example, a bottom surface of plurality of finger elements 210 may be in contact with the top surface of belt 102 of conveyor system 100. With this arrangement, clothing, shoes, and other larger objects may be prevented from falling into the space between the end of belt 102 and end plate 110 and getting stuck in conveyor system 100.

In some circumstances, however, small items that get stuck at the end of conveyor system 100 may cause damage to belt 102, as well as people or other objects on conveyor system 100. For example, small fasteners, such as screws, can often become lodged in the tines or fingers of conventional end plate designs for conveyor systems, causing damage and wear to the belt and other components of the conveyor system. In an example embodiment, each finger element of plurality of finger elements 210 may be slightly spaced apart from adjacent finger elements. For example, as shown in FIG. 2, a plurality of gaps 212 are disposed in an approximately longitudinal direction between each finger element of plurality of finger elements 210. Additionally, in some embodiments, gaps 212 may further extend longitudinally into plate body 200 of end plate 110.

In an example embodiment, plurality of gaps 212 are sized and dimensioned so as to allow small items, such as screws, fasteners, or other small objects (e.g., objects approximately 10 mm or smaller), to fall down below belt 102 of conveyor system 100 and be removed from the top surface of belt 102. For example, in one embodiment, plurality of gaps 212 are approximately 10 mm in width. In other embodiments, gaps 212 between adjacent finger elements 210 may be larger or smaller. For example, the size of plurality of gaps 212 may be based on the size of materials, such as fasteners or other small objects, used on the assembly line or manufacturing facility in which conveyor system 100 is located. With this arrangement, these small items may be removed from belt 102 of conveyor system 100, thereby assisting with preventing unnecessary wear and tear on the components of conveyor system 100.

In some embodiments, end plate 110 may further include additional components that are located beneath a surface in which end plate 110 and conveyor system 100 is installed, such as a factory floor or assembly line. For example, as shown in FIG. 2, end plate 110 includes a support member 214 (also referred to as "cribbing") that is located beneath plate body 200 of end plate 110 and provides a support surface for end plate 110. In some embodiments, support member 214 includes a plurality of guiding fins 216. Plurality of guiding fins 216 have an arc-shaped configuration and are disposed in spaced apart rows along support member 214 extending upwards towards the bottom of plate body 200 of end plate 110. Adjacent ones of guiding fins 216 are spaced apart and define between them gaps 212. Plurality of guiding fins 216 provide structural support to support member 214. The spaced apart configuration of plurality of guiding fins 216 can also provide space for the small items to fall through plurality of gaps 212 in end plate 110 above support member 214.

In some embodiments, end plate 110 may also include components configured to fasten or fix end plate 110 in position relative to belt 102 of conveyor system 100. In this embodiment, end plate 110 includes an assembly bracket 218 that is located behind support member 214 (i.e., opposite the side that faces towards belt 102). Assembly bracket 218 extends from beneath plate body 200 of end plate 110 and includes attachment mechanisms, such as holes or other fastener receiving elements, that allow assembly bracket 218 to attach end plate 110 to corresponding brackets or fixtures located beneath the surface in which end plate 110 and conveyor system 100 is installed, such as a factory floor, assembly line or another type of conveyor support structure.

Figure 3:
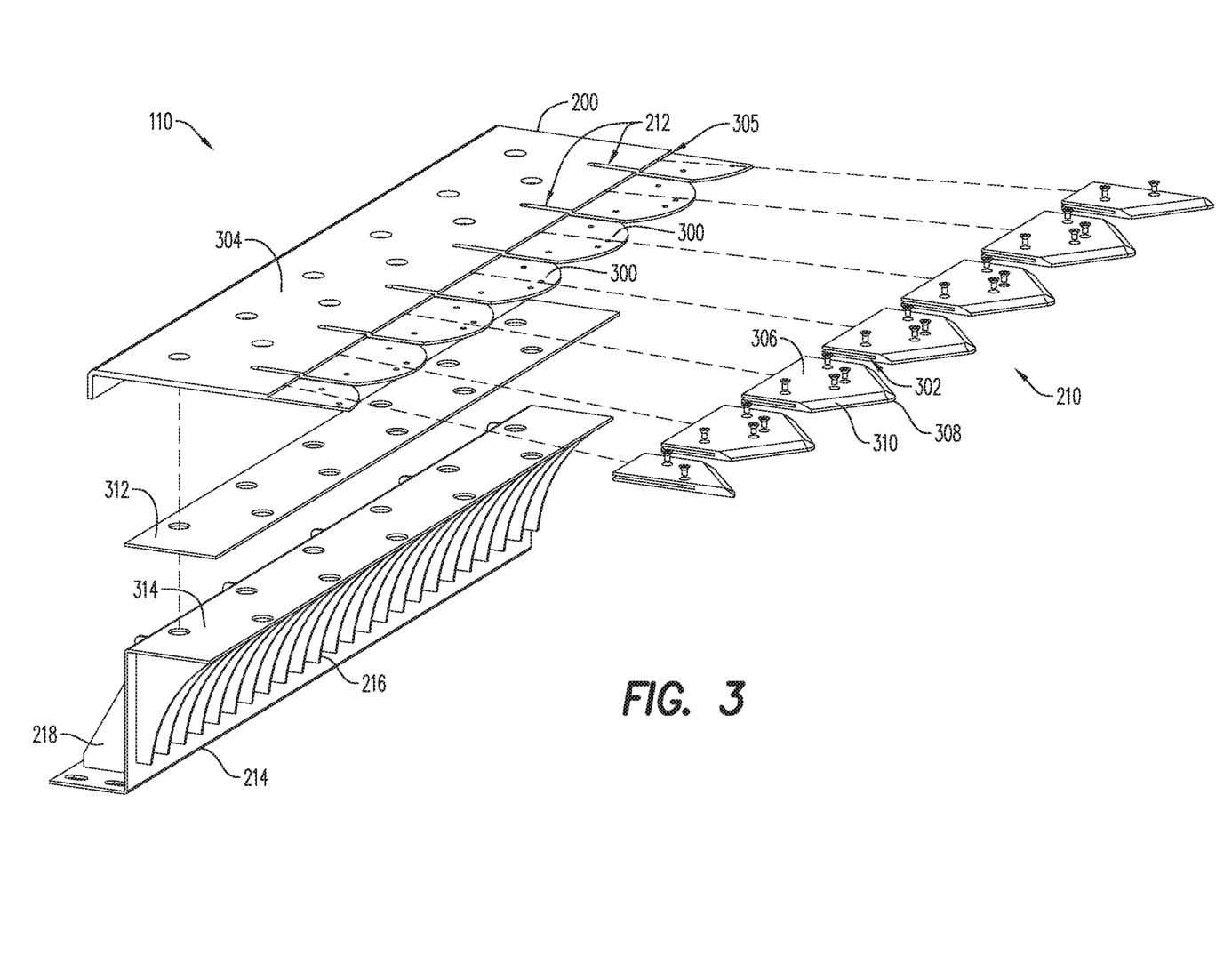
FIG. 3 is an exploded schematic view of an example embodiment of a conveyor end plate.

Referring now to FIG. 3, an exploded schematic view of the example embodiment of end plate 110 is shown. In this embodiment, components of end plate 110 may be seen in relation to each other. As shown in FIG. 3, plate body 200 of end plate 110 includes a plurality of projecting members 300 that extend from the end of end plate 110 that is configured to face towards belt 102 of conveyor system 100. Plurality of projecting members 300 are integrally formed from the same material as plate body 200 and are separated by plurality of gaps 212, described above.

In an example embodiment, plurality of finger elements 210 are configured to slide onto plurality of projecting members 300. For example, each finger element of plurality of finger elements 210 includes a slot or groove 302 on the back side (i.e., facing away from belt 102) that are sized and shaped to fit a corresponding projecting member of plurality of projecting members 300. In an example embodiment, plurality of projecting members 300 have a rounded, semi-hemispherical shape that assists with sliding plurality of finger elements 210 onto plurality of projecting members 300. Additionally, slot or groove 302 on the back side of plurality of finger elements 210 has a corresponding rounded, semi-hemispherical shape to receive plurality of projecting members 300.

In some embodiments, plurality of finger elements 210 are configured to be replaceable and/or interchangeable. In an example embodiment, plurality of finger elements 210 are made of a durable polymer material, such as nylon or other plastic with a high wear resistance. In other embodiments, plurality of finger elements 210 may be made of other materials, such as metal, wood, or various composites of different materials. When plurality of finger elements 210 wear during use, each finger element may be replaced with a new finger element. Additionally, plurality of finger elements 210 may have different configurations, including shapes and dimensions, so that different types of finger elements may be interchangeable with end plate 110 to customize or modify end plate 110 based on the environment in which conveyor system 100 is used. For example, in some cases, the type of finger element used on end plate 110 may be changed based on the type or dimensions of the fasteners or other small items that are likely to fall onto belt 102 of conveyor system 100.

In an example embodiment, a top surface 304 of plate body 200 has a stepped configuration including a ridge 305 where an upper surface of plurality of projecting members 300 is slightly lower than top surface 304 of plate body 200. This configuration allows space for plurality of finger elements 210. Plurality of finger elements 210 include a top surface 306 that is substantially aligned with and substantially flush with top surface 304 of plate body 200 when plurality of finger elements 210 are disposed on plurality of projecting members 300 so as to provide a substantially uniform and continuous top surface for end plate 110.

As will be further described below, plurality of finger elements 210 may have an approximately pentagonal shape. For example, in one embodiment the shape of each finger element of plurality of finger elements 210 is an irregular pentagon with two parallel sides, each of which are perpendicular to a base (i.e., similar in shape to a home plate in baseball), and two converging sides at the front periphery which meet at a point 308 or vertex. Point 308 or the vertex of the pentagon shaped plurality of finger elements 210 faces towards belt 102 when installed in conveyor system 100. Additionally, in some embodiments, the two converging sides at the front periphery forming point 308 or vertex of each finger element may include a beveled edge 310 sloping downward towards the top surface of belt 102. With this arrangement, the shape and configuration of plurality of finger elements 210 may assist with channeling small items into gaps 212 between plurality of finger elements 210 and pushing larger objects or items up and off of belt 102 of conveyor system 100.

In some embodiments, end plate 110 includes a reinforcing or spacing bar 312. Reinforcing bar 312 is configured to fit onto a top surface 314 of support member 214 and beneath the underside of plate body 200. In an example embodiment, reinforcing bar 312 provides additional strength and support to plate body 200 and end plate 110. Additionally, reinforcing bar 312 may also be used to adjust the height of end plate 110 relative to belt 102 of conveyor system 100 so that plurality of finger elements 210 are located slight above or at least partially rest on or touch the top surface of belt 102 of conveyor system 100. With this configuration, reinforcing or spacing bar 312 can assist with eliminating or reducing any gaps or space in the vertical direction between the end of belt 102 and the outermost portion of plurality of finger elements 210.

Figure 4:
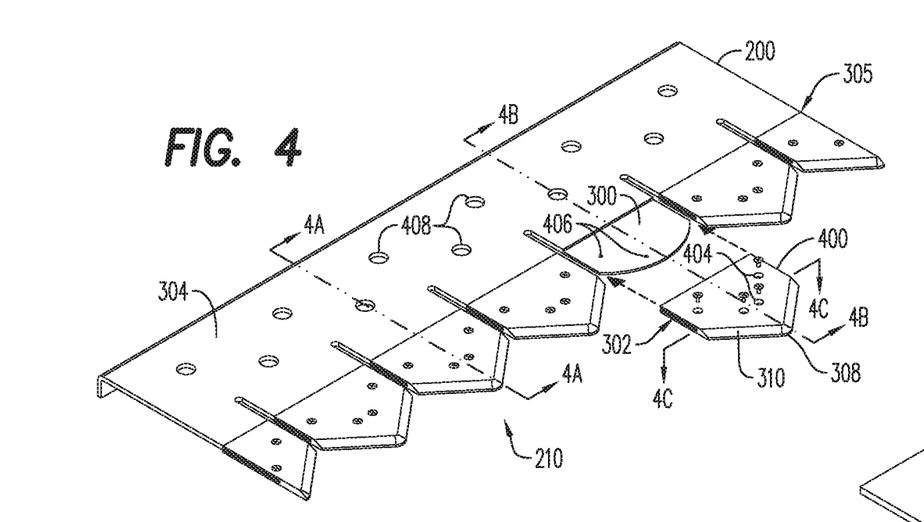
FIG. 4 is an enlarged exploded view of an example embodiment of finger elements of a conveyor end plate.
Figure 4A:
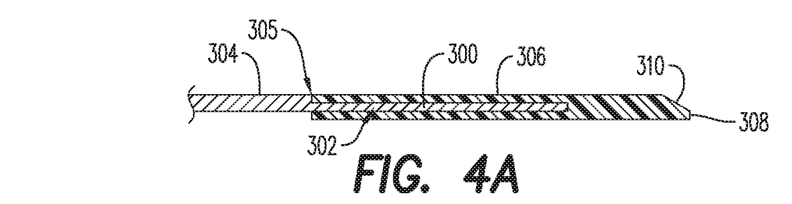
FIG. 4A is a cross-sectional view of FIG. 4 taken along line 4A-4A.

Referring now to FIG. 4, an enlarged exploded view of the example embodiment of plurality of fingers elements 210 of end plate 110 is shown. In this embodiment, several of plurality of finger elements 210 are disposed on corresponding plurality of projecting members 300 of plate body 200. As described above, each finger element of plurality of finger elements 210 is configured to slide onto a corresponding projecting member of plurality of projecting members 300. FIG. 4A shows a finger element disposed on a corresponding projecting member.

Figure 4B:
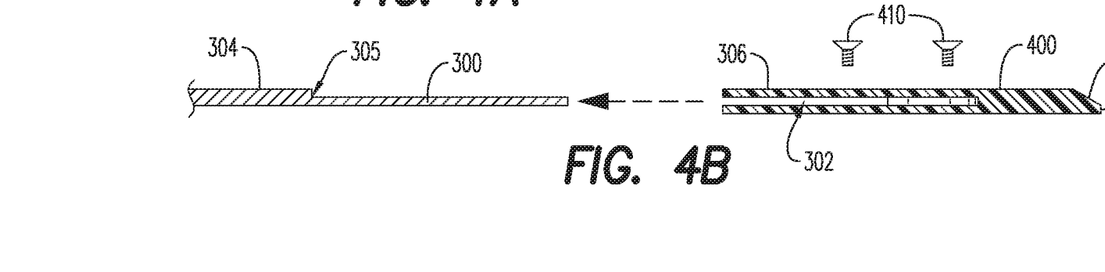
FIG. 4B is a cross-sectional view of FIG. 4 taken along line 4B-4B.
Figure 4C:
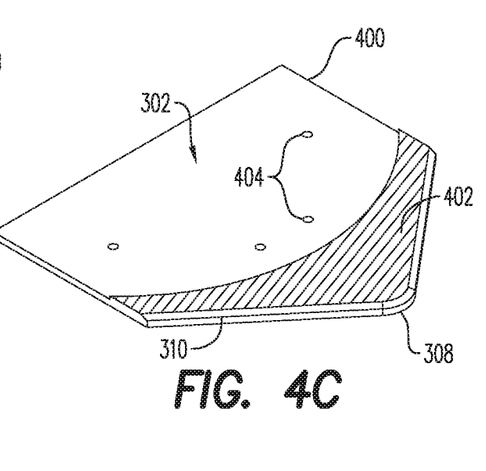
FIG. 4C is a detail section view of a representative finger element taken along line 4C-4C.

As shown in FIGS. 4B and 4C, a representative first finger element 400 is shown in detail. For example, FIG. 4B shows a side view of first finger element 400 sliding onto a corresponding projecting member of plurality of projecting members 300. In this embodiment, first finger element 400 includes slot 302 on the back side to receive a projecting member of plurality of projecting members 300. FIG. 4C illustrates a configuration of slot 302 of first finger element 400 that has a shape that corresponds to the shape of the projecting member so that when first finger element 400 is placed onto the projecting member, first finger element 400 covers and surrounds the projecting member.

When each of the finger elements of plurality of finger elements 210 are disposed on a corresponding projecting member of plurality of projecting members 300, the back side of the finger element (i.e., where slot 302 is located) will contact or be adjacent to ridge 305 of plate body 200 of end plate 110, for example, as shown in FIG. 4A. With this arrangement, end plate 110 may have a substantially uniform and continuous top surface.

As shown in FIG. 4C, in an example embodiment, first finger element 400 includes an extended portion 402 that extends beyond slot 302 and includes point 308 or vertex formed by the two converging sides at the front periphery of first finger element 400. In this embodiment, extended portion 402 is substantially solid through the thickness of first finger element 400. That is, while the portion of first finger element 400 that includes slot 302 is hollow to receive the projecting member, extended portion 402 extends substantially uninterrupted from the top surface to the bottom surface of first finger element 400. Additionally, in some embodiments, extended portion 402 may include beveled edge 310 having a downward slope.

In some embodiments, attachment mechanisms, such as screws or other fasteners, may be used to removably attach plurality of finger elements 210 to corresponding plurality of projecting members 300. For example, as shown in FIG. 4 and shown in detail in FIG. 4C, first finger element 400 includes a plurality of apertures 404 that are aligned with a plurality of holes 406 disposed in plurality of projecting members 300. In some cases, plurality of holes 406 may be threaded to receive a screw 410, as shown in FIG. 4B, or other fastener with corresponding threads to attach plurality of finger elements 210 to plurality of projecting members 300. With this arrangement, plurality of finger elements 210 may be secured to plurality of projecting members 300.

Additionally, by using removable fasteners, such as screws, plurality of finger elements 210 may be easily and quickly replaced or exchanged, for example, to replace worn finger elements or to change the finger element to another made of a different material or having a different arrangement or shape.

In some embodiments, plate body 200 of end plate 110 may include provisions configured to allow plate body 200 to be attached or fastened to other components of end plate 110. As shown in FIG. 4, top surface 304 of plate body 200 includes a plurality of openings 408 to receive fasteners, such as screws or other fastening mechanisms, that attach plate body 200 to components beneath, for example, one or more of support member 214, assembly bracket 218, and/or reinforcing bar 312. Additionally, in an example embodiment, plurality of openings 408 may be tapered or beveled so as to allow a head of a fastener to lie flush along top surface 304 of plate body 200.

Figure 5:
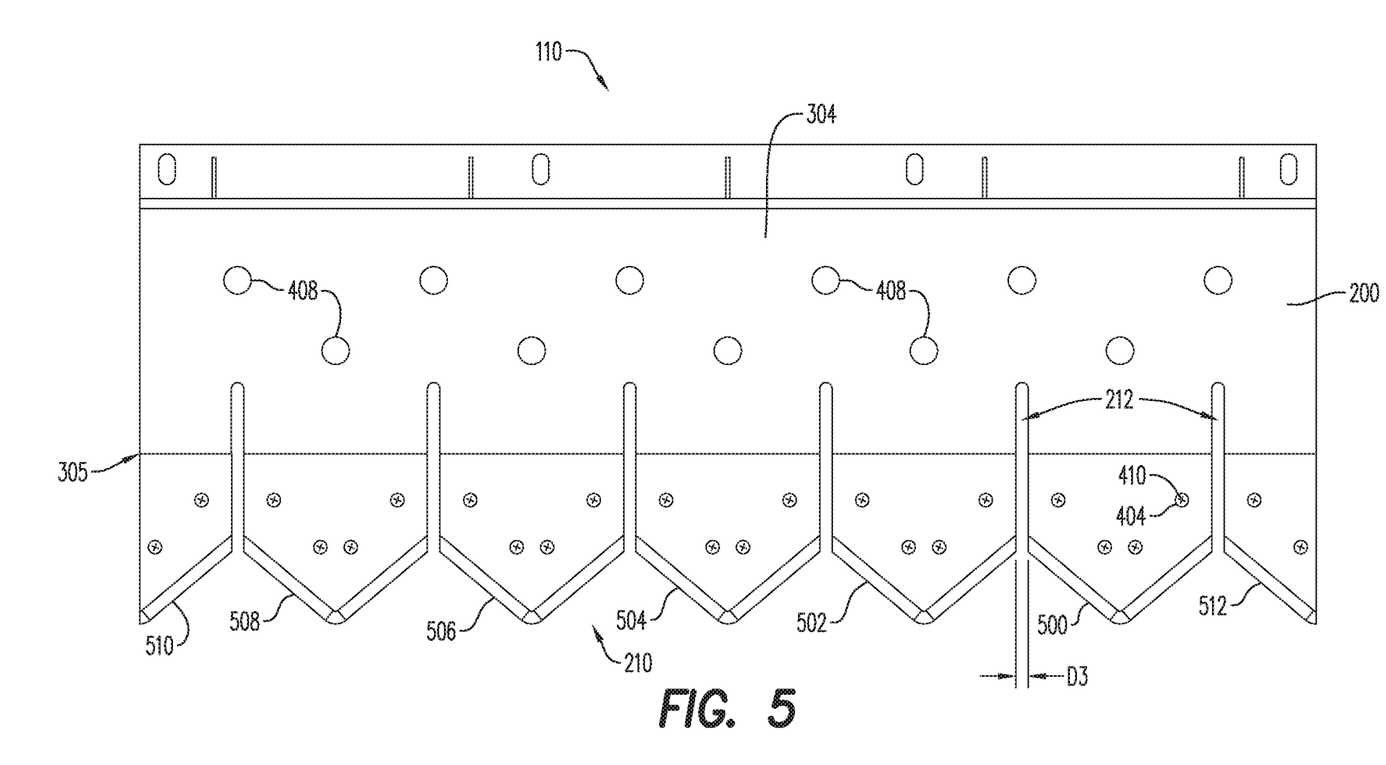
FIG. 5 is a top view of an example embodiment of a conveyor end plate.

Referring now to FIG. 5, a top down view of an example embodiment of end plate 110 is shown. In this embodiment, plurality of openings 408 in top surface 304 of plate body 200 that are configured to receive fasteners to attach plate body 200 to other components of end plate 110 can be seen. Additionally, plurality of apertures 404 in plurality of finger elements 210 that are configured to receive fasteners to attach plurality of finger elements 210 to plurality of projecting members 300 can also be seen.

In various embodiments, the size of end plate 110 may be based on the size of the corresponding belt 102 used in conveyor system 100. For example, the width of end plate 110 may be substantially similar to the width of belt 102. Accordingly, the number of plurality of finger elements 210 on end plate 110 will also vary in proportion to the width of end plate 110. For example, in this embodiment, plurality of finger elements 210 include five individual finger elements, including a first finger element 500, a second finger element 502, a third finger element 504, a fourth finger element 506, and a fifth finger element 508. It should be understood that a wider end plate can accommodate a larger number of finger elements, while a narrower end plate will accommodate a smaller number.

In an example embodiment, the individual finger elements of plurality of finger elements (i.e., finger elements 500-508) are each separated by gap 212. In this embodiment, gap 212 has a width (e.g., third distance D3) that is defined by a distance between adjacent sides of each finger element (e.g., between first finger element 500 and second finger element 502 as shown in FIG. 5). As previously described, in different embodiments, the width of gap 212 (e.g., third distance D3) may vary. In one embodiment, the width of gap 212 (e.g., third distance D3) is approximately 10 mm. However, in other embodiments, the width may be larger or smaller.

In some embodiments, end plate 110 may include half-finger elements that are disposed on each side of end plate 110. For example, as shown in FIG. 5, end plate 110 includes a first half-finger element 510 disposed at one side of end plate 110 and a second half-finger element 512 disposed at the other side opposite first half-finger element 510. Each of the half-finger elements, first half-finger element 510 and second half-finger element 512, has a shape that is substantially similar to the shape of each finger element of plurality of finger elements 210 bisects along a central line. In this embodiment, first half-finger element 510 and second half-finger element 512 have complementary shapes (i.e., a right half and a left half) that are mirror images of one another. With this arrangement, the side edges of end plate 110 may be provided with first half-finger element 510 and second half-finger element 512 to prevent objects or items from falling into or getting caught on the side of belt 102 of conveyor system 100.

Figure 6:
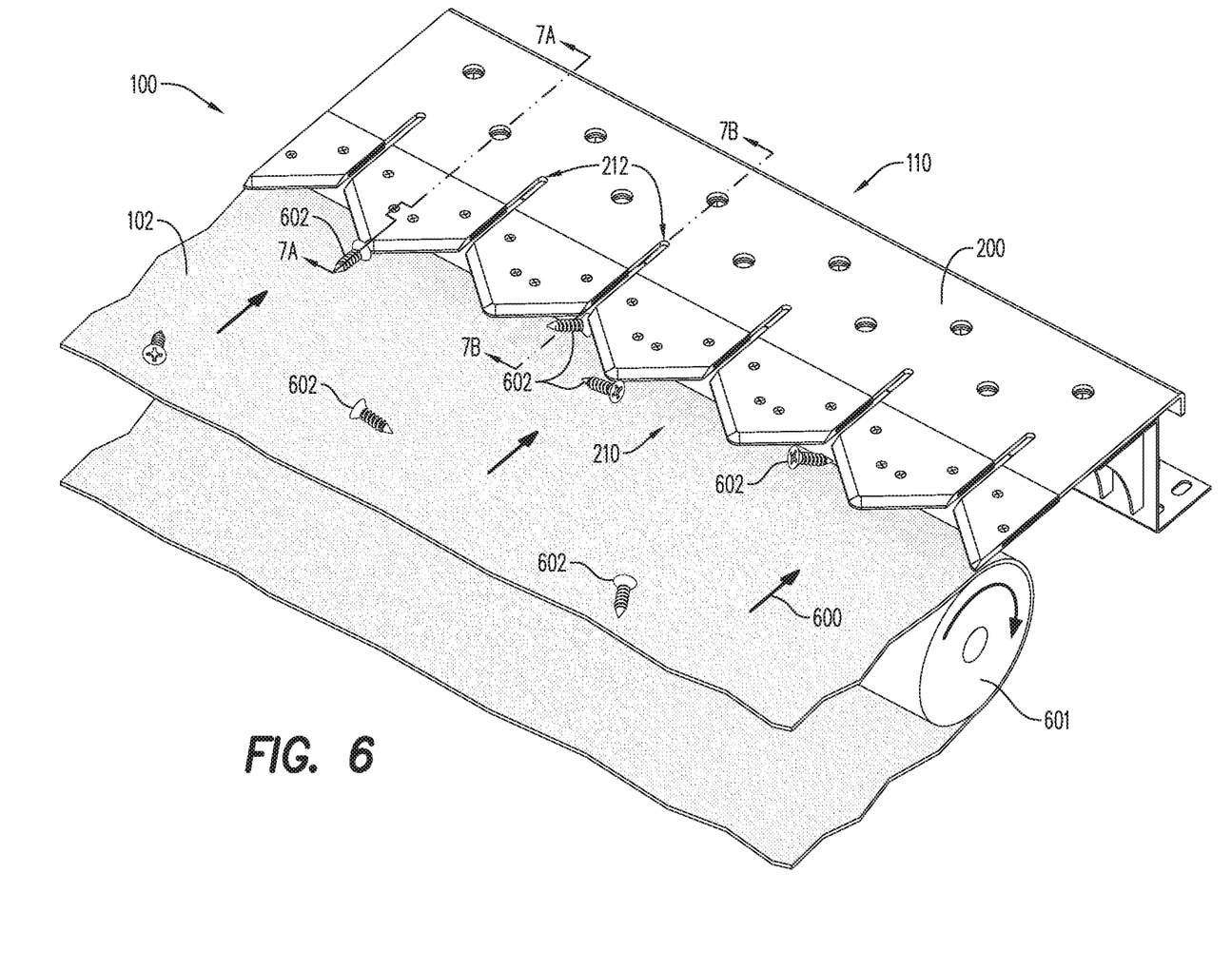
FIG. 6 is a representational view of an example embodiment of a conveyor end plate in use on a conveyor system.

Referring now to FIG. 6, a representational view of an example embodiment of end plate 110 in use on conveyor system 100 is shown. According to the techniques of the example embodiments described herein, plurality of finger elements 210 on end plate 110 assist with clearing small items off of belt 102 of conveyor system 100. Thus, end plate 110 can help prevent these small items from getting caught and causing damage or excessive wear to belt 102 and other components of conveyor system 100.

For example, in this embodiment, belt 102 of conveyor system 100 is moving in a direction 600 towards end plate 110 by action of rollers 601 that are configured to turn belt 102. During use of conveyor system 100, such as for moving people or objects on an assembly line or manufacturing facility, one or more small items, for example, plurality of screws 602, may fall onto belt 102 while conveyor system 100 is in operation. Accordingly, plurality of screws 602 and other small items are propelled on belt 102 towards plurality of finger elements 210 of end plate 110. As described above, the shape and configuration of plurality of finger elements 210 assists with channeling small items, including plurality of screws 602, towards gaps 212 between finger elements 210 where they may fall below belt 102. Plurality of finger elements 210 on end plate 110 also help push or direct larger objects up and over end plate 110 so that they do not get caught in belt 102.

Figure 7A:
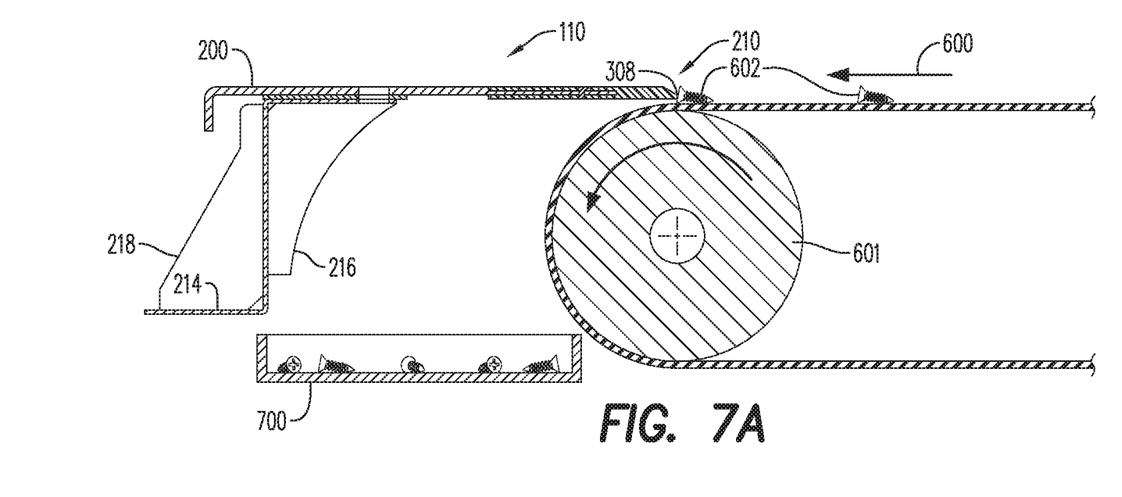
FIG. 7A is a representational side view of the example embodiment of a conveyor end plate in use on a conveyor system taken along corresponding line 7A-7A shown in FIG. 6.
Figure 7B:
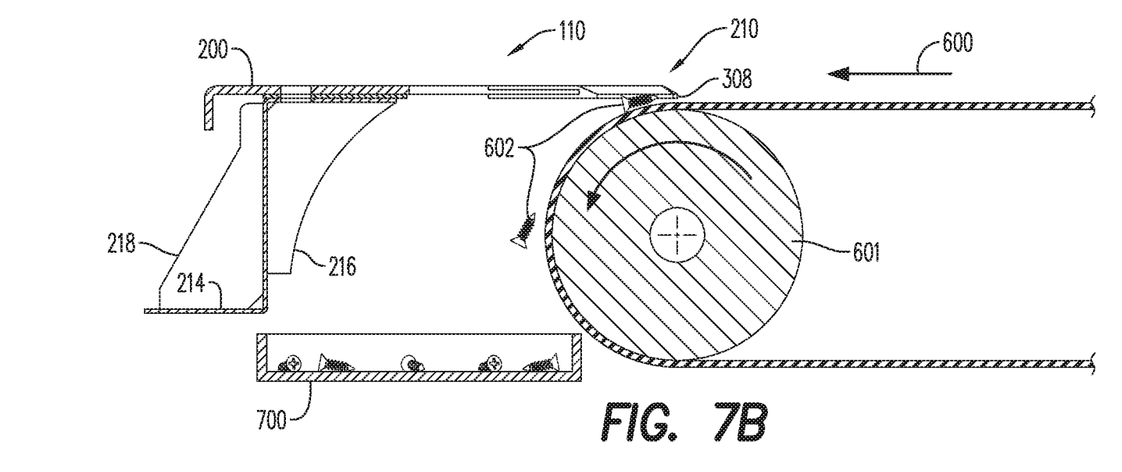
FIG. 7B is a representational side view of the example embodiment of a conveyor end plate in use on a conveyor system taken along corresponding line 7B-7B shown in FIG. 6.

FIGS. 7A and 7B illustrate use of end plate 110 of conveyor system 100 to remove small items (e.g., screws 602) from belt 102. As shown in FIG. 7A, belt 102 of conveyor system 100 is moving in direction 600 towards end plate 110 by rotational of roller 601. One or more of plurality of screws 602 are on the surface of belt 102 and are being propelled by belt 102 towards plurality of finger elements 210. In this embodiment, a trough 700 can be seen beneath end plate 110 to catch the small items, such as screws 602, that are removed from belt 102 by end plate 110.

In this embodiment, screws 602 contact a portion of the front periphery of one of the finger elements of plurality of finger elements 210. For example, as shown in FIG. 7A one of screws 602 is touching point 308 or vertex of one of plurality of finger elements 602.

As shown in FIG. 7B, the shape and configuration of plurality of finger elements 210 assists with directing screws 602 towards gaps 212 between plurality of finger elements 210 so that screws 602 fall beneath end plate 110. For example, in this embodiment, screws 602 are propelled by belt 602 through gaps 212 and beneath end plate 110. Trough 700 is configured to catch screws 602 as they are removed from belt 102 and fall below end plate 110. Additionally, plurality of guiding fins 216 on support member 214 may assist with channeling screws 602 into trough 700 as they are propelled by belt 102. With this configuration, end plate 110 and plurality of finger elements 210 may assist with removing small items from belt 102 of conveyor system 100, thereby reducing the wear and tear on belt 102 and other components of conveyor system 100.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. An end plate for a conveyor system, the conveyor system including an endless conveyor belt adapted to turn about rollers and defining a conveying surface and a return surface, the conveying surface of the conveyor belt defining an entrance end and an exit end defined by the direction of motion of the conveyor belt, the end plate comprising:
   a plate body including a plurality of projecting members extending from one end of the plate body;
   a plurality of finger elements each disposed over a corresponding one of the plurality of projecting members in fitted relationship to one another;
   wherein the plurality of finger elements are separated by a gap between each finger element;
   further comprising a support member disposed beneath the plate body, wherein the plate body is attached to the support member;
   wherein the support member includes a plurality of guiding fins having an arc-shaped configuration; and
   wherein the plurality of guiding fins are disposed in spaced apart rows along the support member and extend upwards towards a bottom of the plate body.

2. The end plate according to claim 1, wherein the end plate is disposed at the exit end of the conveyor belt and the plurality of projecting members and the plurality of finger elements are configured to face towards the conveyor belt.

3. The end plate according to claim 2, wherein a bottom surface of the plurality of finger elements is configured to contact the conveying surface of the conveyor belt.

4. The end plate according to claim 1, wherein the plate body includes a top surface having a ridge extending laterally across the plate body, the plurality of projecting members extending out from the ridge; and
   wherein an upper surface of the plurality of projecting members is lower than the top surface of the plate body.

5. The end plate according to claim 4, wherein a top surface of the plurality of finger elements disposed on the plurality of projecting members is substantially continuous with the top surface of the plate body.

6. The end plate according to claim 1, further comprising a plurality of apertures in a top surface of plurality of finger elements; and
   wherein the plurality of apertures are aligned with a plurality of holes in the plurality of projecting members.

7. The end plate according to claim 6, wherein each finger element is attached to a corresponding projecting member by fasteners disposed through the plurality of apertures and the plurality of holes.

8. The end plate according to claim 1, wherein the gap between each finger element is approximately 10 mm.

9. The end plate according to claim 1,
   further comprising an assembly bracket that extends from beneath the plate body and is located on a side of the support member that faces away from the conveyor belt.

10. The end plate according to claim 1, wherein each finger element of the plurality of finger elements includes a slot on a back side of the finger element that is configured to receive a corresponding projecting member of one of the plurality of projecting members.

11. An end plate for a conveyor system, the conveyor system including an endless conveyor belt adapted to turn about rollers and defining a conveying surface and a return surface, the conveying surface of the conveyor belt defining an entrance end and an exit end defined by the direction of motion of the conveyor belt, the end plate comprising:
   a plate body including at least one projecting member extending from an end of the plate body that is configured to face towards the conveyor belt;
   at least one removable finger element disposed over the at least one projecting member and attached thereto;
   wherein the at least one removable finger element has an approximately pentagonal shape;
   further comprising a support member disposed beneath the plate body, wherein the plate body is attached to the support member;
   wherein the support member includes a plurality of guiding fins having an arc-shaped configuration; and
   wherein the plurality of guiding fins are disposed in spaced apart rows along the support member and extend upwards towards a bottom of the plate body.

12. The end plate according to claim 11, wherein the approximately pentagonal shape of the at least one finger element is an irregular pentagon with two parallel sides, each of which are perpendicular to a base, and two converging sides at a front periphery which meet at a point.

13. The end plate according to claim 12, wherein the point of the pentagonal shaped at least one finger element faces towards the conveyor belt of the conveyor system.

14. The end plate according to claim 12, wherein the two converging sides at the front periphery of the at least one finger element include a beveled edge that is configured to slope downward towards a top surface of the conveyor belt of the conveyor system.

15. The end plate according to claim 12, wherein the finger element includes a slot on a back side of the finger element that is configured to receive the corresponding projecting member.

16. The end plate according to claim 11, wherein the at least one finger element is made of a durable polymer material.

17. A conveyor system, comprising:
   an endless belt adapted to turn about rollers and defining a conveying surface and a return surface, the conveying surface of the belt defining an entrance end and an exit end defined by the direction of motion of the belt;
   an end plate disposed at the exit end of the belt facing the belt, the end plate comprising:
      a plate body including a plurality of projecting members extending from one end of the plate body;
      a plurality of finger elements disposed over the plurality of projecting members, wherein each finger element of the plurality of finger elements includes a slot on a back side of the finger element that is configured to receive a projecting member of the plurality of projecting members;
      wherein the plurality of projecting members and the plurality of finger elements are configured to face towards the belt;
      wherein the plurality of finger elements are separated by a clap between each finger element;
   further comprising a trough disposed beneath the end plate; and
      wherein items with a size equal to or less than the gap that are disposed on the belt are configured to be channeled into the clap between each finger element and fall into the trough.

18. The conveyor system according to claim 17, wherein the gap between each finger element is approximately 10 mm.

19. The conveyor system according to claim 17, further comprising
- a support member disposed beneath the plate body, wherein the plate body is attached to the support member; and
- wherein the support member includes a plurality of guiding fins having an arc-shaped configuration.

20. The conveyor system according to claim 17, wherein each finger element has an approximately pentagonal shape defined by two parallel sides, each of which are perpendicular to a base, and two converging sides at a front periphery which meet at a point.

\* \* \* \* \*